United States Patent [19]

Heilweil

[11] Patent Number: 4,481,120

[45] Date of Patent: Nov. 6, 1984

[54] HIGH TEMPERATURE STABLE AQUEOUS BRINE FLUIDS VISCOSIFIED BY N-HETEROCYCLIC ORGANOPHOSPHORUS COMPOUNDS

[75] Inventor: Israel Heilweil, Princeton, N.J.

[73] Assignee: Mobil Oil Corporation, New York, N.Y.

[21] Appl. No.: 490,625

[22] Filed: May 2, 1983

[51] Int. Cl.$^3$ .......................... C09K 7/00; C09K 3/00
[52] U.S. Cl. ............................ 252/8.5 A; 252/8.5 C; 252/8.55 R
[58] Field of Search ............ 252/8.5 A, 8.5 P, 8.52 C, 252/180, 8.55 R, 8.55 D

[56] References Cited

U.S. PATENT DOCUMENTS

| | | | |
|---|---|---|---|
| 3,997,293 | 12/1976 | Redmore | 252/8.5 C |
| 4,101,654 | 7/1978 | Redmore | 252/8.55 D |
| 4,209,449 | 6/1980 | Mayhew et al. | 260/403 |
| 4,215,064 | 7/1980 | Lindemann et al. | 252/110 |

*Primary Examiner*—Theodore Morris
*Attorney, Agent, or Firm*—Alexander J. McKillop; Michael G. Gilman; Charles J. Speciale

[57] ABSTRACT

There is provided an aqueous brine fluid containing an N-heterocyclic organophosphorus compound which serves to increase the viscosity thereof. These viscosified brine fluids are particularly useful in drilling operations, most especially as solids-free drilling, completion, packer and workover fluids for drilling operations involving deep wells.

13 Claims, No Drawings

HIGH TEMPERATURE STABLE AQUEOUS BRINE FLUIDS VISCOSIFIED BY N-HETEROCYCLIC ORGANOPHOSPHORUS COMPOUNDS

CROSS-REFERENCE TO RELATED APPLICATION

This application is related to copending U.S. application Ser. No. 413,577, filed Aug. 31, 1982 in the name of C. S. H. Chen and D. E. Walsh describing high temperature stable aqueous brine fluids viscosified by cationic surfactants such as celyltrimethylammonium bromide.

BACKGROUND OF THE INVENTION

The present invention relates to brine fluids which are viscosified with N-heterocyclic organophosphorus compounds.

During the drilling of an oil well, a usually aqueous fluid is injected into the well through the drill pipe and recirculated to the surface in the annular area between the well-bore wall and the drill string. The functions of the drilling fluid include: lubrication of the drill bit, transportation of cuttings to the surface, counterbalancing formation pressure to prevent an influx of oil, gas or water into the well, maintenance of hole stability until casings can be set, suspension of solids when the fluid is not being circulated, and minimizing fluid loss into and possible associated damage/instability to the formation through which drilling is taking place.

Proper counterbalancing of formation pressure is obtained by establishing fluid density at the desired level usually via the addition of barite (greater than or equal to 95% barium sulfate). Transportation of cuttings and their suspension when the fluid is not circulating is related to the fluid viscosity and thixotropy which depend on solids content and/or use of a polymer. Filter loss control is obtained also by the use of clays and/or added polymers.

Fluid properties are constantly monitored during the drilling operations and tailored to accommodate the nature of the formation stratum being encountered at the time. When drilling reaches the producing formation special concern is exercised. Preferentially low solids content fluids are used to minimize possible productivity loss by solids plugging. Proper fluid density for counterbalancing formation pressure may be obtained by using high salt concentration aqueous brines while viscosity and filter loss control may be obtained by polymer addition. Substantial future oil well drilling will take place at greater and greater depths where higher and higher temperatures are encountered. High temperatures coupled with the desire for low solids content and preferably no added solids, require brine tolerant and high temperature stable compounds for viscosity and filtration control. Conventionally employed polymers such as starch, carboxymethyl cellulose, and modified polyacrylates are not stable at high temperatures and some have severe brine tolerance limitations.

For very deep drilling in particular, say below approximately 15,000 feet, the highest density drilling fluids are required to counterbalance formation pressures so as to insure the integrity of drilled holes. At these depths, temperatures of approximately 150° C. and higher are encountered. One of the densest, clear brine drilling fluids is based on $ZnBr_2/CaBr_2$ concentrates (19 lbs./gal., approximately 56% $ZnBr_2$ and 20% $CaBr_2$). However, deep well operations with this system have been severely limited by the fact that no viscosifiers, fluid loss control agents, corrosion inhibitors, etc., have yet been developed able to withstand temperatures of 150° C. and above without degradation or gellation at pH's approximately 2 to 5, characteristic of this type of fluid.

SUMMARY

According to one aspect of the invention, there is provided a brine fluid comprising:
(i) water;
(ii) at least about 30% by weight (or even at least about 50% by weight) of salt; and
(iii) a viscosity increasing amount of a brine tolerant N-heterocyclic organophosphorus compound of the formula

where
$R_1$ is $O^-$, $O^-M_1^+$, OH or $OR_4$;
$R_2$ is $O^-$, $O^-M_2^+$, OH or $OR_5$;
$R_3$ is an organic moiety having at least one positively charged N-heterocyclic moiety;
$R^4$ and $R^5$ are the same or different organic moieties; and
$M_1^+$ and $M_2^+$ are the same or different cations.

Either $R_1$ or $R_2$ may be the same as $OR_3$. Also, both $R_1$ and $R_2$ may be the same as $OR_3$.

The organophosphorus compound may be in the form of a zwiterion.

$R_3$ may have no more than one positively charged N-heterocyclic moiety. This N-heterocyclic moiety may have from 5 to 7 atoms in the ring structure thereof. This N-heterocyclic moiety may either be bound directly to the oxygen atom of the group $OR_3$ through a carbon atom of the ring structure of the N-heterocyclic moiety or may be bound to the oxygen atom of the group $OR_3$ by a linking moiety Y. Y may be alkylene, optionally interrupted by up to 3 oxygen atoms, of up to 12 carbon atoms, which alkylene chain may optionally be substituted with lower alkyl, alkoxy, hydroxy or hydroxyalkyl of not more than 10 carbon atoms each.

Examples of N-heterocyclic ring radicals include imidazolyl, N-alkylmorpholino, alkylpyrimidino, alkyloxazolinyl, and the like.

Examples of $R_3$ include those moieties of the following formulae:

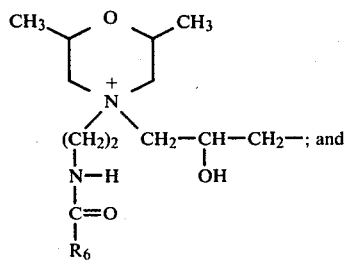

-continued

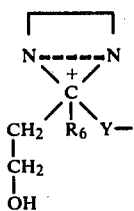

where $R_6$ is alkyl, alkenyl, alkoxy, or hydroxyalkyl of from 5 to 22 carbon atoms each, or aryl or alkaryl of up to 20 carbon atoms.

Examples of $R_4$ and $R_5$ include those moieties as defined for $R_3$ or selected from the group consisting of alkyl or hydroxylalkyl of up to 6 carbon atoms, polyhydroxyalkyl of up to 10 carbon atoms, glyceryl, cycloalkyl of up to 6 carbon atoms, aryl or arylalkyl of up to 10 carbon atoms.

Examples of $M_1$ and $M_2$ include alkali metals and alkaline earth metals.

According to another aspect of the invention, there is provided an aqueous brine fluid for drilling operations selected from the group consisting of drilling fluids, completion fluids, packer fluids and workover fluids, said brine fluid comprising a viscosity increasing amount of an N-heterocyclic organophosphorus compound of the formula (I).

DETAILED DESCRIPTION

An N-heterocyclic organophosphorus compound is added to aqueous high brine content solutions (10–65% wt. salt as, e.g., NaCl, $CaCl_2$, NaBr, $CaBr_2$, $ZnCl_2$, $ZnBr_2$ or mixtures thereof) providing a liquid of substantially enhanced viscosity which is particularly suitable for use as an oil well completion fluid. The use of such a compound results in improved resistance to viscosity loss at elevated temperatures (e.g., more than about 100° C. or even more than 150° C.) compared to conventional viscosity building water/brine soluble polymers and thus is useful in the drilling of deep wells. It may also provide some filtration control properties, reducing fluid loss into, and possible damage to, the oil bearing formation.

Building viscosity with N-heterocyclic organophosphorus compounds is particularly advantageous due to the high brine environment of drilling completion fluids. Polymers can exhibit shear and brine instability and in some cases thermal instability. Polymeric polyelectrolytes tend to coil in the presence of salts and lose solution viscosity. Many polymers undergo irreversible chain scission (i.e. breakage of covalent bonds) and loss of solution viscosity. The thickening agents of the present invention actually work better in higher brine and do not suffer permanent shear degradation.

Examples of N-heterocyclic organophosphorus compounds usable according to the present invention are described in the Mayhew et al U.S. Pat. No. 4,209,449 and the Lindemann et al U.S. Pat. No. 4,215,064, the entire disclosures of which are expressly incorporated herein by reference. More particularly these compounds may be characterized as phosphate quarternary compounds and phosphobetaine compounds, respectively.

EXAMPLE

Two phosphate compounds commercially available from Mona Industries of Paterson, N.J. under the tradenames of Monaquat PT-Z and Monaquat P-TC were tested for viscosifying properties. Monaquat PT-Z is believed to be of the general formula

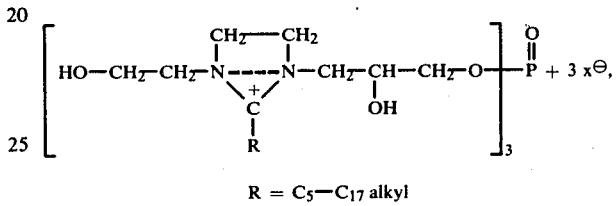

$R = C_5-C_{17}$ alkyl

It has been surprising to discover that Monaquat P-TC and PT-Z exhibit viscosifying properties in clear, dense $CaBr_2$ (14 lbs./gal.) and $ZnBr_2/CaBr_2$ (19 lbs./gal.) brines, but that these viscosities are retained after heating for 16 hours at 150° C. only for the $ZnBr_2/CaBr_2$ system, implying unusual thermal stability in this brine. The data is shown in Table 1, below. Surprisingly, also, these derivatives form clear solutions at concentrations of approximately 4% and possibly higher, and remain optically clear on prolonged storage.

TABLE I

| Brine | % Additives | Viscosity of Brine | Viscosity of Brine plus Additive Prior to Heating | Viscosity of Brine plus Additives After Heating at 150° C. |
|---|---|---|---|---|
| | | Monaquat P-TZ | | |
| $CaBr_2/ZnBr_2$ (19 lbs/gal) | 2.79 | 23.3 | 39.8 | 41.0 (16 hrs.) |
| $CaBr_2$ (14 lbs/gal) | 1.35 | 6.3 | 9.0 | 5.8 (6 hrs.) |
| | | Monaquat P-TC | | |
| $CaBr_2/ZnBr_2$ | 3.74 | 23.3 | 41.0 | 40.0 (16 hrs.) |
| $CaBr_2$ | 1.87 | 6.3 | 7.0 | 13.4 (6 hrs.) |

Viscosities were determined at 25° C. and 115 sec$^{-1}$.

Since the N-heterocyclic organophosphorus compounds usable according to the present invention may be essentially basic in character, brine solutions thereof may be preferably acidic, e.g., having a pH of 5 or less, in order to maintain the solubility of the N-heterocyclic organophosphorus compounds. The salt of many brines, e.g., $ZnBr_2/CaBr_2$ is generally sufficiently acid that the pH of the brine is less than about 5, e.g., from about 2 to about 5. Optionally, however, a sufficient amount of an acid such as HCl or HBr may be added to the fluid to maintain a sufficiently low pH to maintain the salt and N-heterocyclic organophosphorus compound in solution.

In the search for new oil resources drilling will be deeper, and more expensive than ever before. Consequently, the need for high performance oil well completion fluids which will minimize the chances of damaging well productivity could be of substantial benefit.

The viscosity increasing amount of N-heterocyclic organophosphorus compound used in accordance with aspects of the present invention is that amount which is sufficient to achieve the desired viscosifying functions. In drilling fluids these functions involve transportation of cuttings to the surface and suspension of solids when the drilling fluid is not being circulated.

The salinity of the aqueous brine drilling fluid in accordance with aspects of the invention may be from at least 10% by weight up to the salt saturation point of the fluid, which is generally about 60-65% by weight. Drilling completion fluids may have a salinity of, e.g., from about 30% to about 65% by weight.

Although the viscosifying effect of N-heterocyclic organophosphorus compounds in accordance with aspects of the present invention is preferably useful in solids-free fluids, e.g., for drilling in the vicinity of oil or gas producing formations, this effect may also be used when drilling in areas other than in the vicinity of oil or gas formations. Thus, N-heterocyclic organophosphorus compound viscosified drilling fluids may contain constituents other than water, brine and N-heterocyclic organophosphorus compounds, such as filter loss control solids in an amount sufficient to prevent loss of fluid to the formation.

N-heterocyclic organophosphorus compound viscosified aqueous brine drilling fluids, particularly completion fluids, are felt to be especially useful when used in formations having a temperature of at least 100° C. (e.g., 100°-150° C.). Such temperatures may occur in relatively deep walls.

The N-heterocyclic organophosphorus compound, via its viscosifying interaction with brine salts, may constitute essentially the sole viscosifying component of the brine fluid. Optionally, however, the brine fluid may contain further viscosifying additives, such as polymeric viscosifiers, provided that such further viscosifying additives do not materially detract from the viscosifying effect of the organophosphorus compound.

The drilling fluids of the present invention preferably do not contain thermally unstable polymeric thickeners such as starch, carboxymethyl cellulose, and modified polyacrylates or mixing agents such as crude oil and diesel oil.

The N-heterocyclic organophosphorus compounds of the present invention may be of assistance in exploring new oil, gas, and geothermal energy in deep and high temperature formations, particularly where utilization of $ZnBr_2/CaBr_2$ brines is concerned. These compounds are felt to have unique thermal stability in such brines.

It is anticipated that the N-heterocyclic organophosphorus compounds, would be useful as drilling rate enhancing additives, as corrosive inhibitors, deemulsifiers, etc., not only in a wide range of clear brine compositions (e.g., based on Zn halides, alkali halides, phosphates, etc.), but also in water based muds and invert emulsions (particularly with long chain hydrophobes).

The phosphobetaines, being essentially nonionic in nature, would be expected to show an increase of viscosifying properties with increased temperature, in contrast to ionic (cationic and anionic) viscosifiers. Combinations of such phosphobetaines with other surfactants (cationic and anionic) would retain and/or enhance the desired viscosifying and other properties in various formulations.

There is a good possibility that above N-heterocyclic organophosphorus compounds in the presence of selected polymers, would preferentially adsorb on well-bore surfaces and anchor these polymers to these surfaces so as to provide novel and unique formulations to inhibit fluid loss to formations with dense, completely solids-free drilling fluids. At present, dense, clear brine drilling fluids are fortified against fluid loss via the addition of solid calcium carbonate, NaCl, and other dispersions, and hence are not solids-free.

Although the above concepts mainly concentrate on drilling fluids, their implications to tertiary recovery in brine fields and several areas of lubrication technology (e.g., cutting fluids, invert emulsion industrial fluids) are noted.

Although the brines of the present invention have been described herein as being useful in drilling operations when actual drilling is taking place, it is particularly noted that these brines are also useful in such drilling operations as completion fluids, packer fluids and workover fluids. "Completion fluids" are those used to flush potentially formation-damaging materials (cuttings, clays) from the well-bore prior to perforation. "Packer fluids" are left in the annulus, between casing and tubing, when the well is placed on production. "Workover fluids," frequently clear brines, are used in cleaning and repairing old wells to increase productivity.

Although the brine fluids of the present invention are felt to have particular utility in the field of drilling operations, it is felt that these fluids may have utility in a wide range of industrial applications, such as, for example, in processing minerals from salty solutions, in the formulation of "synthetic" water-based pneumatic fluids and novel lubricants, and in light energy conversion based on heat transport between concentrated and less concentrated brine layers in ponds.

The present invention may comprise, consist essentially of or consist of the materials or method steps described herein.

What is claimed is:

1. A viscosified brine fluid comprising:
(i) water;
(ii) at least about 30% by weight of salt; and
(iii) a viscosity increasing amount of a brine tolerant N-heterocyclic organophosphorus compound of the formula

where
$R_1$ is $O^-$, $O^-M_1^+$, OH or $OR_4$;
$R_2$ is $O^-$, $O^-M_2^+$, OH or $OR_5$;
$R_3$ is an organic moiety having at least one positively charged N-heterocyclic moiety;
$R_4$ and $R_5$ are the same or different organic moieties; and
$M_1^+$ and $M_2^+$ are the same or different cations.

2. A brine fluid according to claim 1, wherein either $R_1$ or $R_2$ is the same as $OR_3$.

3. A brine fluid according to claim 1, wherein both $R_1$ and $R_2$ are the same as $OR_3$.

4. A brine fluid according to claim 1, wherein said organophosphorus compound is a zwiterion.

5. A brine fluid according to claim 1, wherein $R_3$ has no more than one positively charged N-heterocyclic moiety, said N-heterocyclic moiety having from 5 to 7 atoms in the ring structure thereof, said N-heterocyclic moiety either being bound directly to the oxygen atom of the group $OR_3$ through a carbon atom of the ring structure of said N-heterocyclic moiety or being bound to the oxygen atom of the group $OR_3$ by a linking moiety Y, and Y is alkylene, optionally interrupted by up to 3 oxygen atoms, of up to 12 carbon atoms, which alkylene chain may optionally be substituted with lower alkyl, alkoxy, hydroxy or hydroxyalkyl of not more than 10 carbon atoms each.

6. A brine fluid according to claim 5, wherein $R_3$ is selected from the group consisting of the following formulae:

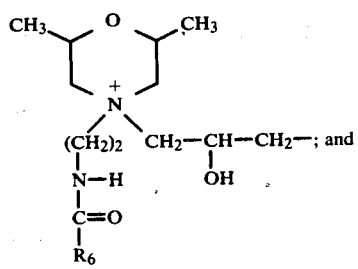

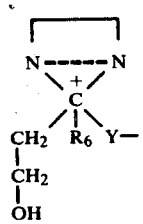

where $R_6$ is alkyl, alkenyl, alkoxy, or hydroxyalkyl of from 5 to 22 carbon atoms each, or aryl or alkaryl of up to 20 carbon atoms.

7. A brine according to claim 1, wherein $R_4$ and $R_5$ are as defined for $R_3$ or are selected from the group consisting of alkyl or hydroxyalkyl of up to 6 carbon atoms, polyhydroxyalkyl of up to 10 carbon atoms, glyceryl, cycloalkyl of up to 6 carbon atoms, aryl or arylalkyl of up to 10 carbon atoms.

8. A brine according to claim 1, wherein $M_1$ and $M_2$ are selected from the group consisting of alkali metals and alkaline earth metals.

9. A brine fluid according to claim 1, wherein:
(a) the amount of said salt is from about 50% by weight up to the salt saturation point of said fluid;
(b) the amount of said N-heterocyclic organophosphorus compound is from about 0.05% by weight up to about 10% by weight of said fluid; and
(c) the remainder of said fluid is essentially water.

10. A brine fluid according to claim 1, having a pH from about 2 to about 5.

11. An aqueous brine fluid for drilling operations selected from the group consisting of drilling fluids, completion fluids, packer fluids and workover fluids, said brine fluid comprising a viscosity increasing amount of an N-heterocyclic organophosphorus compound of the formula

where
$R_1$ is $O^-$, $O^-M_1^+$, OH or $OR_4$;
$R_2$ is $O^-$, $O^-M_2^+$, OH or $OR_5$;
$R_3$ is an organic moiety having at least one positively charged N-heterocyclic moiety;
$R_4$ and $R_5$ are the same or different organic moieties; and
$M_1^+$ and $M_2^+$ are the same or different cations.

12. A fluid according to claim 11, having a salinity from about 10% by weight up to the saturation point of the fluid.

13. A fluid according to claim 12 which is a solids-free drilling completion fluid, for use in drilling a bore hole with a drill bit, wherein the said drill bit is in the vicinity of an oil or gas producing formation.

* * * * *